United States Patent
Swander et al.

(10) Patent No.: US 7,856,655 B2
(45) Date of Patent: *Dec. 21, 2010

(54) SYSTEM AND METHOD FOR IMPROVED NETWORK SECURITY

(75) Inventors: Brian D. Swander, Kirkland, WA (US); Bernard D. Aboba, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 305 days.

This patent is subject to a terminal disclaimer.

(21) Appl. No.: 10/882,537

(22) Filed: Jun. 30, 2004

(65) Prior Publication Data

US 2004/0243853 A1    Dec. 2, 2004

Related U.S. Application Data

(63) Continuation of application No. 09/741,217, filed on Dec. 20, 2000, now Pat. No. 6,915,437.

(51) Int. Cl.
| | |
|---|---|
| *H04L 9/32* | (2006.01) |
| *G06F 7/04* | (2006.01) |
| *H04K 1/00* | (2006.01) |
| *G06F 15/16* | (2006.01) |
| *G06F 17/00* | (2006.01) |

(52) U.S. Cl. ................ 726/2; 726/14; 713/168; 713/169; 380/247; 380/248; 380/249; 380/250

(58) Field of Classification Search ............. 713/151, 713/153, 154, 171; 726/1–2, 14; 709/227
See application file for complete search history.

(56) References Cited

U.S. PATENT DOCUMENTS

| | | | |
|---|---|---|---|
| 5,835,726 A | 11/1998 | Shwed et al. | |
| 6,055,236 A | 4/2000 | Nessett et al. | |
| 6,101,543 A * | 8/2000 | Alden et al. | 709/229 |
| 6,105,027 A * | 8/2000 | Schneider et al. | 707/9 |
| 6,178,505 B1 * | 1/2001 | Schneider et al. | 713/168 |
| 6,253,321 B1 * | 6/2001 | Nikander et al. | 713/160 |
| 6,330,562 B1 * | 12/2001 | Boden et al. | 713/167 |
| 6,332,163 B1 * | 12/2001 | Bowman-Amuah | 709/231 |
| 6,408,336 B1 * | 6/2002 | Schneider et al. | 709/229 |
| 6,467,040 B1 * | 10/2002 | Apte et al. | 713/168 |

(Continued)

OTHER PUBLICATIONS

The Internet Society, 1998, http://xml.resource.org/public/rfc/html/rfc2409.html, p. 1-31.*

(Continued)

*Primary Examiner*—William R Korzuch
*Assistant Examiner*—Jeremiah Avery
(74) *Attorney, Agent, or Firm*—Wolf, Greenfield & Sacks, P.C.

(57) ABSTRACT

A system is provided for establishing a secure link among multiple users on a single machine with a remote machine. The system includes a subsystem to filter traffic so that traffic from each user is separate. The subsystem generates and associates a Security Association (SA) with at least one filter corresponding to the user and the traffic, and employs the SA to establish the secure link. An Internet Key Exchange module and a policy module may be included to generate and associate the security association, wherein the policy module is configured via Internet Protocol Security (IPSEC).

31 Claims, 8 Drawing Sheets

U.S. PATENT DOCUMENTS

| | | | |
|---|---|---|---|
| 6,507,908 B1 * | 1/2003 | Caronni | 713/153 |
| 6,636,898 B1 | 10/2003 | Ludovici et al. | |
| 6,738,909 B1 | 5/2004 | Cheng et al. | |
| 6,772,331 B1 * | 8/2004 | Hind et al. | 713/151 |
| 6,986,061 B1 * | 1/2006 | Kunzinger | 713/153 |
| 7,020,456 B2 * | 3/2006 | Smeets et al. | 455/411 |
| 7,107,620 B2 * | 9/2006 | Haverinen et al. | 726/29 |
| 7,336,790 B1 * | 2/2008 | Caronni et al. | 380/277 |
| 7,512,796 B2 * | 3/2009 | Haverinen et al. | 713/168 |

OTHER PUBLICATIONS

Sailer, Reiner. Security Services in an Open Service Environment. 14th Annual Computer Security Applications Conference. Pub Date: Dec. 1998. Relevant pp. 223-234. The World Wide Web at: http://ieeexplore.ieee.org/stamp/stamp.jsp?tp=&arnumber=738624.*

P. Karn, et al., "Photuris: Session-Key Management Protocol", RFC 2522, Mar. 1999, 80 pages.

D. McDonald, et al., PF_KEY Key Management API, Version 2, Internet Engineering Task Force, Jul. 1998, 64 pages.

Jari Arkko, et al., PF_KEY Extensions for Reducing Policy Information in Kernel, Internet Engineering Task Force, Jul. 14, 2000, 6 pages.

Mark Joseph Edwards, IBM's eNetwork Well-Suited to All-TCP/IP Networks, InfoWorld, May 17, 1999, pp. 38, 42.

Laura Wonnacott, There Are Exceptions to Encryption Export Controls That Can Stymie Your Business, InfoWorld, Jan. 18, 1999, p. 61.

Joel Scambray, Firewall Appliances: Network Security for All, InfoWorld, Dec. 14, 1998, pp. 68-72.

Remote Access: VPN vs. Dial-Up, InfoWorld, Dec. 8, 1997, pp. 102-122.

Morgan Stern, Extend Your Net With VPNs, BYTE, Nov. 1997, pp. 114-119.

The Harder Side of VPNs, BYTE, Nov. 1997, p. 119.

Lynda Radosevich, New Oak to Unveil Extranet Access Switch, InfoWorld, Sep. 29, 1997, p. 58.

Stephen Lawson, Vendors Provide Internet-Based Remote Access, InfoWorld, Aug. 18, 1997, p. 19.

Virtual Private Network Solutions, InfoWorld, Sep. 22, 1997, pp. 1, 24.

Stephen Lawson, Ascend Platform Combines Security, Monitoring, InfoWorld, May 19, 1997, p. 8.

Lai-Han Szeto, Aventail Delivers Highly Secure, Flexible VPN Solution, InfoWorld, Jun. 23, 1997, p. 64D.

* cited by examiner

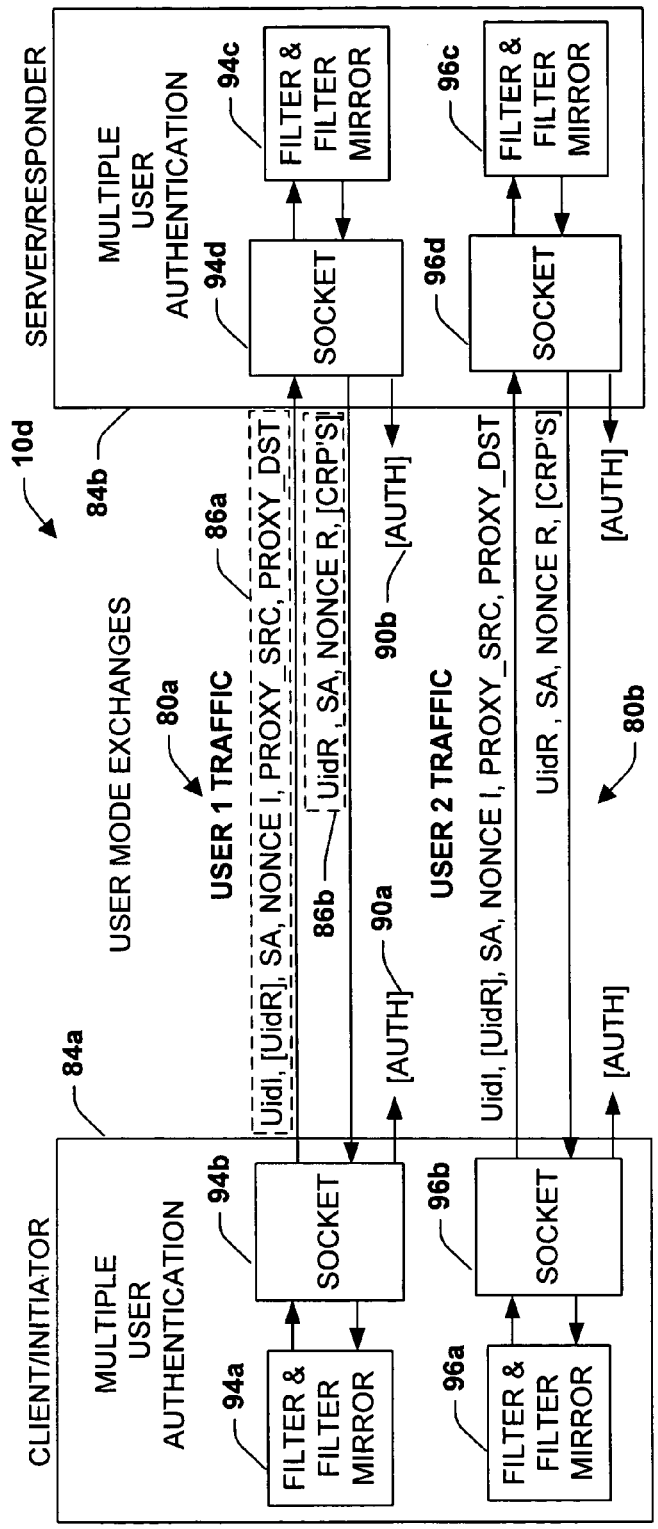
Fig. 2a
Fig. 2b

SYSTEM AND METHOD FOR IMPROVED NETWORK SECURITY

CROSS REFERENCE

This application is a continuation of U.S. application Ser. No. 09/741,217, filed Dec. 20, 2000, entitled SYSTEM AND METHOD FOR IMPROVED NETWORK SECURITY, the disclosure of which is hereby incorporated by reference as if fully set forth herein.

TECHNICAL FIELD

The present invention relates generally to computer systems, and more particularly to a system and method for improving network security by enabling multiple user and service authentication between network systems.

BACKGROUND OF THE INVENTION

As network technologies, such as the Internet have evolved, security issues involving network communications have steadily increased. For example, it is common to receive news involving hacking and/or other espionage attempts to disrupt, harm, or disable computer systems via the Internet. Furthermore, network communications are often spied upon by thieves wherein valuable information is often stolen. Thus, private network data may be exploited. This data may relate to confidential business, financial and personal information, for example. In order to combat these problems, systems designers and architects have developed encryption techniques and other negotiation algorithms to secure network communications and facilitate negotiated trusts between systems communicating over networks. Encryption algorithms enable encrypted network information to be sent between two parties wherein only the parties may decrypt the information via a decryption key. Simply encrypting and decrypting communications is not sufficient, however. It is important for both parties to trust one another before agreeing on an encryption/decryption scheme. If trusts are not properly established, a non-trusted receiving party may be able to fool a sending party into providing information relating to the encryption/decryption method. Thus, negotiation algorithms are provided with the encryption/decryption methods to establish trusts between the parties.

One such system for providing network security relates to the Internet Key Exchange (IKE) and the Internet Protocol Security (IPSec) standards. According to these standards, multiple phases of negotiated exchanges occur between network systems to establish a trust between systems, to determine encryption methods to be employed, and to establish keys for encrypting and decrypting the information. One phase associated with IKE is known as a Main Mode negotiation phase and generally establishes a security relationship between systems based upon the IP address of the systems. Upon completion of the Main Mode phase, a second phase known as a Quick Mode negotiation occurs between the systems secured in Main Mode in order to secure the network traffic between the systems. The Quick Mode phase utilizes "keying" material determined in Main Mode in order to secure the network traffic via IPSec protocol. Unfortunately, since the network trusts are established at a system level according to the IP address of the systems, IKE and IPSec generally are not able to authenticate multiple users from the same system, wherein the origin and integrity of a message sent from a particular user is verified. Since the trusts are established at the system level based upon IP addresses, any user logging into to a trusted system would therefore have access to the other trusted system. Similarly, authentication of multiple services offered by a trusted system is not provided by IKE and IPSec because of the system level authentication problems described above.

In view of the above problems associated with conventional security systems, there is an unsolved need for a system and/or methodology to facilitate multiple user and service level authentication between network systems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to improved network security and performance associated with multiple user and/or multiple service authentication environments. This may be achieved by providing an intermediate protocol layer for user authentication in addition to conventional authentication protocols. Conventional IKE architectures provide a Main Mode layer for machine-to-machine authentication and a Quick Mode layer for handling IPSec traffic parameters. These systems however may not securely provide for more sophisticated and complex situations, however. One situation may include multiple users securely accessing a single machine, for example, yet requiring independent security associations for each user. Another scenario may involve a single machine requiring access to a plurality of services from another machine wherein each service may require a different security association. Thus, according to these and other scenarios, the present invention provides different authentication credentials for each security association More particularly, a User Mode authentication layer is provided to work in conjunction with conventional authentication layers (e.g., Main Mode, Quick Mode) to enable improved network security/performance. Security is improved since a user's identity is always encrypted from another user which may be operating on the same machine—independent of conventional Main Mode/Quick Mode authentication layers. Thus, multiple users from a single machine may operate in a secure and isolated manner. Performance is improved by enabling a plurality of Quick Mode authentications to run on top of a single User Mode layer. The User Mode layer may include keying material derived in User Mode during all Quick Mode transactions pertaining to a given User Mode. A User Mode ID is also provided to the Quick Mode layer to enable state look-ups which may also be included as part of a Quick Mode header. User Mode limits may also be established to require additional security exchanges to be performed after a predetermined number of authenticated transactions have occurred.

In accordance with one aspect of the invention, a system of establishing a secure link among multiple users on a single machine with a remote machine is provided. The system includes a subsystem to filter traffic so that traffic from each user is separate; wherein the subsystem generates and associates a Security Association (SA) with at least one filter corresponding to the user and the traffic and employs the SA to establish the secure link. It is to be appreciated that the system can reside on either the single machine or the remote machine and that each Security Association described above or in the following description relating to multiple users and/or services may be associated with an unique authentication credential.

Another aspect of the invention relates to a system of establishing a secure link between a first machine and multiple services on a second machine. The system includes a subsystem to filter traffic so that traffic from each service is separate; wherein the subsystem generates and associates a Security Association (SA) with at least one filter corresponding to the user and the service and employs the SA to establish the secure link.

Another aspect of the invention relates to a method of establishing a secure link among multiple users on a single machine with a remote machine. The method includes: filtering traffic so that traffic from each user is separate; negotiating and authenticating a Security Association (SA) with at least one filter corresponding to the user and the traffic; and employing the SA to establish the secure link.

Yet another aspect of the invention relates to a method of establishing a secure link between a first machine and multiple services on a second machine. The method includes: filtering traffic so that traffic from each service is separate; negotiating and authenticating a Security Association (SA) with at least one filter corresponding to the services and the traffic; and employing the SA to establish the secure link.

Still yet another aspect of the invention relates to either a computer readable medium or a data packet, comprising: a component to filter traffic between a first machine, having multiple users, and a second machine so that traffic for the first machine is separated in accordance with the respective users; and a component to generate and associate a Security Association (SA) with at least one filter, corresponding to at least one of the users and the respective traffic, and employs the SA to establish a secure link between the first and second machines. It is to be appreciated that the invention can be applied to multiple services running on a single computer as compared to multiple users employing the single computer. Furthermore, it is to be understood that the invention can be applied to a first process, being associated with multiple users or services, and a second process as compared to the aforementioned first and second computer. Accordingly, distributed processing is contemplated by the inventors of the subject invention and is intended to fall within the scope of the hereto appended claims.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 2a is a schematic block diagram illustrating a system for providing multiple user authentication in accordance with an aspect of the present invention;

FIG. 2b is a schematic block diagram illustrating filters for separating user traffic in accordance with an aspect of the present invention;

DETAILED DESCRIPTION OF THE INVENTION

Figure 1A:
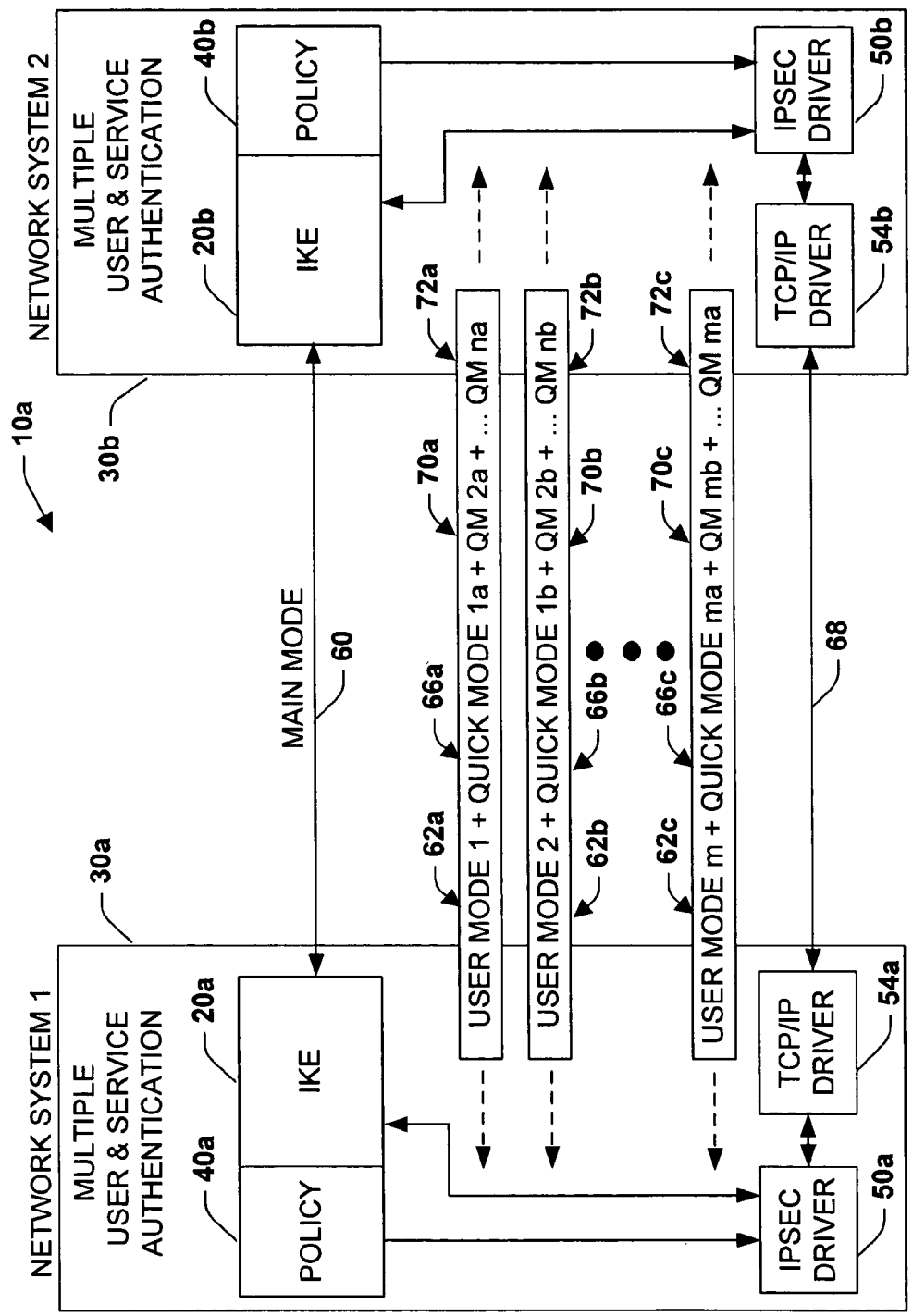
FIG. 1a is a schematic block diagram illustrating a multiple user and authentication system in accordance with an aspect of the present invention.

The present invention is now described with reference to the drawings, wherein like reference numerals are used to refer to like elements throughout. As used in this application, the term "component" is intended to refer to a computer-related entity; either hardware, a combination of hardware and software, software, or software in execution.

The present invention relates to a system and methodology to facilitate improved network security between multiple users and services associated with network systems. An intermediate negotiating phase, referred to as User Mode, is provided to an Internet Key Exchange (IKE) and Internet Protocol Security (IPSec) standard to enable separation of user and service network traffic in order to improve security between multiple users on a single system and between multiple services running a server. The User Mode phase is integrated with standard Main Mode and Quick Mode negotiation phases associated with IKE and IPSec. By separating network traffic, security is improved over conventional Main/Quick Mode systems since each user and service associated with a source network system may be individually authenticated before communications commence with a destination network system. This type of security was generally not possible with conventional IKE/IPSec systems in that authentication was associated with an IP address at the system level of the source/destination network systems. Thus, distinguishing and authenticating between different users and services was not conventionally provided at the systems level.

Referring initially to FIG. 1, a system 10a illustrates a multiple user and authentication system in accordance with an aspect of the present invention. The system 10a includes an Internet Key Exchange (IKE) subsystem 20a and 20b for securing network traffic between network systems 30a and 30b. As will be described in more detail below, the system 10a may also include policy modules 40a and 40b to enable configuration of the IKE subsystems 20a and 20b. The policy modules 40a and 40b may also provide security configuration information to Internet Protocol Security (IPSec) drivers 50a and 50b which communicate via TCP/IP drivers 54a and 54b thereby enabling secure network traffic 68 between the network systems 30a and 30b.

A negotiation phase, referred to as Main Mode 60 is initiated between the IKE subsystems 20a and 20b in order to establish a secure trust between the network systems 30a and 30b. A User Mode negotiation 62a-62c is provided to authenticate multiple users and services associated with the network systems 30a and 30b. The User Mode 62a-62c is utilized to authenticate and separate user and service traffic between the network systems 30*a* and 30*b* and operates as an interim mode between Main Mode 60 and a second negotiation phase known as Quick Mode 66*a*-66*c*. As will be described in more detail below, Quick Mode negotiations 66*a*-66*c* are employed to secure network traffic 68 between the network systems 30*a* and 30*b*.

In accordance with the present invention, Quick Mode negotiations 66*a*-66*c* are modified in order that a users identity (See for example, ref. 86*a* in FIG. 2*a*) may be negotiated in the User Mode 62*a*-62*c*. The negotiated identity is then employed in all Quick Modes that run in conjunction with the User Mode. This may be achieved by utilizing keying material—(described below), derived in User Mode during all Quick Modes that are associated with a particular User Mode. For example, a first user may initiate communications between the network systems 30*a* and 30*b*. The User Mode 62*a* negotiation would then commence to securely authenticate the first users identity with the network system 30*b*. The Quick Mode 66*a* negotiation would then commence to secure network traffic 68 associated with the first user by employing the keying information derived in User Mode 62*a*. If the first user were to open additional communications channels, (e.g., sockets), other Quick Mode negotiations 70*a* and 72*a* may be initiated to secure the additional channels. The additional Quick Modes 70*a* and 72*a* are also associated with the User Mode 62*a*. If a second user were to initiate communications, the second User Mode 62*b* may then be initiated with the associated Quick Mode 66*b*, and associated Quick Modes 72*a* and 72*b*, if necessary. It is to be appreciated that a plurality of users and services may be similarly authenticated in accordance with the present invention.

The policy modules 40*a* and 40*b*, hereinafter referred to as the policy module 40, retrieve IPSec policy (illustrated below in FIG. 1*b*) from a directory domain, a configured set of local policies, or from a local cache. The policy module 40 then distributes authentication and security settings to the IKE modules 20*a*, 20*b*, hereinafter referred to as the IKE module 20 and IP filters, described below, to the IPSec Driver 50*a*, 50*b*, hereinafter referred to as the IPSec driver 50. The IKE module 20 receives authentication and security settings from the policy module 20 and waits for requests to negotiate IPSec security associations (SAs). When requested by the IPSec Driver 50, the IKE module 20 may negotiate two types of SAs (e.g., an ISAKMP SA and an IPSec SA) with an appropriate endpoint based on the request of the IPSec Driver 50 and policy settings obtained from the policy module 40. After an IPSec SA is negotiated, the IKE module 40 sends the SA settings to the IPSec Driver 50. The IPSec Driver 50 monitors and secures unicast IP traffic. After the IP filters are received from the policy module 40, the IPSec Driver 50 determines which packets are permitted, blocked, or secured. For secure traffic, the IPSec Driver 50 either employs active SA settings to secure the traffic or requests that new SAs be created. The IPSec Driver 50 may be bound to the TCP/IP Drivers 54*a*,54*b* when the policy module begins to provide IPSec processing for IP packets that pass through the TCP/IP Drivers 54*a*,54*b*.

Figure 1B:
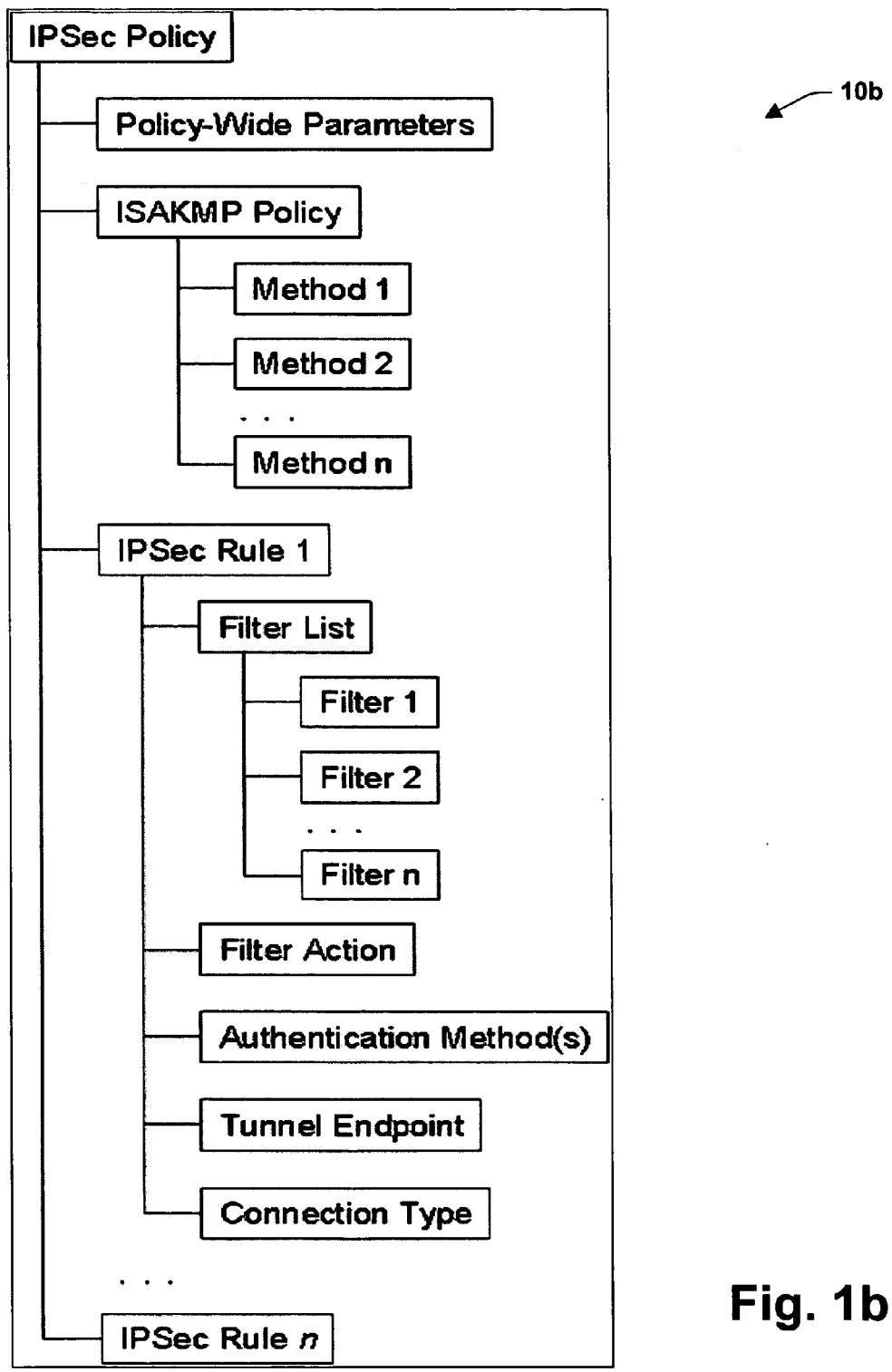
FIG. 1b is a block diagram illustrating an IPSec policy data structure in accordance with an aspect of the present invention.

Referring now to FIG. 1*b*, the IPSec policies 10*b* and filters associated with the policy module 40 described above will now be described in more detail. The IPSec policy 10*b* may be contained in a data storage (not shown) associated with the policy module 40. The data in a policy represents a desired protection for traffic between computers on a network. The data is made up of various attributes related to the computers (e.g., IP address and port number), the communication methods allowed (e.g., algorithms and key lengths), and IKE key negotiation and management.

The IPSec policy 10*b* may include the following information:
Policy-wide parameters—Includes polling intervals employed to detect changes in policy.
ISAKMP policy—Contains IKE parameters, such as encryption key lifetimes, and other settings. The ISAKMP policy also contains a list of security methods for protecting the identity of IPSec peers during authentication.
IPSec rules—Contains one or more rules that describe IPSec behavior for the policy. IPSec rules are the part of the policy data that is employed to associate IKE negotiation parameters with one or more IP filters.

Each IPSec rule may include the following:
Filter List—Contains one or multiple predefined filters that describe the types of traffic to which an action (permit, block, or secure) is applied.
Filter Action—Includes the type of action to take (permit, block, or secure) for packets matching the filter list. For the secure action, the negotiation data contains one or more security methods that are used in order of preference during IKE negotiations and other IPSec behavior settings. Each security method describes the security protocol to use (such as AH or ESP), the specific cryptographic algorithms, and session key regeneration settings.
Authentication Method(s)—Contains one or more authentication methods that are utilized for protection during IKE negotiations. For example, such authentication methods may be related to a Kerberos protocol, a certificate issued from a specified certificate authority, and/or a preshared key.
Tunnel Endpoint—Contains settings that determine whether traffic is tunneled and, if it is, the tunnel endpoint.
Connection Type—Contains a setting that specifies whether the rule applies to local area network (LAN) connections, to Point-to-Point Protocol (PPP)-based connections, or to both types of connections.

Filters are part of the policy data employed to specify network connection information. One or more filters are associated with negotiation data; defining which security measures are utilized to protect the specific network connections that match the filter. The policy module processes all filters obtained from the IPSec policy. The policy module maintains a list of filters for the IPSec components and provides the filter list to the IPSec driver. The following provides a description of the filter data:

The policy module manages a filter list that includes items corresponding to each filter configured in the IPSec policy and a generic filter and mirrored filters. Each item in the list may include the following information:
Network address data,
Source/destination address, source/destination mask, source/destination port, and protocol,
The determination of whether the filter is for a tunnel and, if it is, its address,
The rule ID for the filter,
Flags indicating:
   Whether the filter should be mirrored
   Whether the filter was provided to the IPSec Driver
   Whether the filter is instantiated from a more generic filter
   Whether the filter is dynamic
   Whether the filter is blocking, clear, or pass through
   The direction of the filter
   The weight of the filter
   The type of interface that the filter supports
   The parent filter ID (if instantiated)

It is noted, that when the filter has a mirror, a copy of the filter is created and the source and destination addresses are swapped.

Figure 1C:
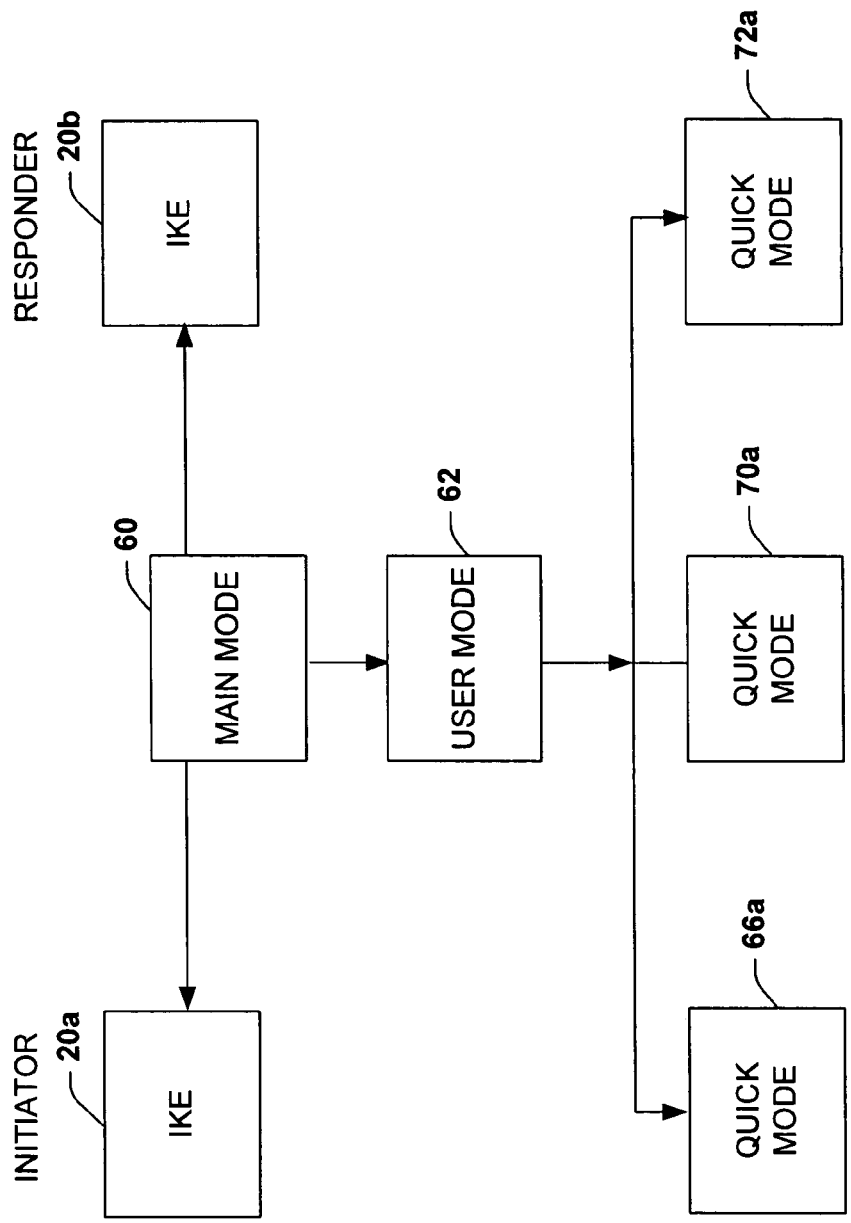
FIG. 1c is a schematic block diagram illustrating an IKE module and Main Mode, User Mode, and Quick Mode interrelationships in accordance with an aspect of the present invention.

Referring now to FIG. 1c, a system 10c illustrates an aspect of the present invention relating to the IKE module 20 and interrelationships of Main Mode 60, User Mode 62 and Quick Mode 66 illustrated in FIG. 1. The IKE module 40 is employed to establish a combination of mutually agreeable policy and keys that defines security services, protection mechanisms, and cryptographic keys between communicating peers (e.g., network systems 30a and 30b depicted in FIG. 1). This combination may be referred to as a security association (SA). The SA is employed by the IPSec Driver to protect all corresponding network traffic.

To create an SA between two computers, the IETF has established a standard method of SA and key exchange resolution, which combines the Internet Security Association and Key Management Protocol (ISAKMP) and the Oakley Key Determination Protocol. This standard method is IKE and is described in the IETF standard RFC 2409. Along with the User Mode negotiation described below in relation to FIG. 2a, two other negotiations also take place before IPSec begins processing IP packets. Oakley generates and manages the authenticated keys used to encrypt and decrypt the information for both negotiations utilizing a Diffie-Hellman key exchange protocol.

The Oakley standard provides the Main/Quick modes as is well understood. Main Mode 60 provides for new key generation material and a new encryption key. This key generation material is then employed by the User Mode 62 negotiations of the present invention that are described in more detail in relation to FIG. 2a below. Quick Mode 66 negotiations that are derived from the User Mode and Main Mode key generation materials are employed to generate a new encryption keys when each party (Main/User mode) has determined the key generation material.

The Main Mode negotiations 60 establishes a secure channel known as the ISAKMP SA between two computers for the purpose of protecting security negotiations. To achieve this, IKE 20 authenticates computer identities and exchanges keying material to establish a shared secret key. The Main Mode 60 provides the necessary identity protection during this exchange. This enables privacy by facilitating that no identity information is sent without encryption between communicating hosts. The Quick Mode negotiations 66 establishes a secure channel between two computers for the purpose of protecting data. Because this negotiation phase involves the establishment of SAs that are negotiated on behalf of the IPSec service, the SA created in Quick Mode is referred to as an IPSec SA. During this phase, keying material is refreshed or, if necessary, new keys are generated. The Oakley Quick Mode is not considered a complete exchange because it is dependent upon a Main Mode/User Mode exchange.

After an SA has been established, IKE 40 sends the SA and the shared encryption key to the IPSec Driver for use in protecting IP network traffic. The IKE module or the IPSec Driver may initiate rekeying based on duration lifetime, byte count lifetime, and/or policy changes. The IKE module 40 performs Main Mode negotiations with a peer system to establish protection suites and keys for subsequent use in protecting User/Quick Mode IKE communications. Main Mode negotiation may occur in three parts: Negotiation of protection suites, A Diffie-Hellman exchange, and machine Authentication. ISAKMP payloads may be associated within messages relating to Main Mode. These payloads may be related as follows: A Security Association, a key exchange, and ID payload.

A first Security Association payload is a list of proposed protection suites for the ISAKMP SA sent by a network system initiator of the desired communications. A second Security Association payload sent in a reply message is a specific protection suite for the ISAKMP SA that is common to both IPSec network systems. It is selected by a responder network system. The Key Exchange payload may be sent in a third message by the initiator and in a fourth message by the responder and contains Diffie-Hellman key determination information for the Diffie-Hellman key exchange process. The Nonce payload contains a nonce, which is a pseudorandom number that is utilized once. The initiator and responder network systems each send their own unique nonces. Nonces are employed to provide replay protection.

When initiating an IKE exchange, the IKE module 40 proposes protection suites based on the applied security policy. Each proposed protection suite includes attributes for encryption algorithms, hash algorithms, authentication methods, and Diffie-Hellman Oakley groups. The following Table lists some exemplary protection suite attribute values that are supported by the IKE module 20. It is to be appreciated that other attributes and values may be included.

| Attribute | Attribute Value |
| --- | --- |
| Encryption algorithm | DES, 3DES |
| Integrity algorithm | MD5, SHA-1 |
| Authentication method | Kerberos, preshared key, certificate |
| Diffie-Hellman group | Group 1 (768-bit), Group 2 (1024-bit) |

The initiating IKE module 40a proposes one or more protection suites in a similar order as they may appear in the applied security policy. If one of the protection suites is acceptable to the responding IKE peer 40b, the responder selects one of them for use and responds to the initiator with its choice. After a protection suite has been negotiated, the IKE module 40 generates a Diffie-Hellman public and private key pair based on the negotiated Diffie-Hellman Oakley group. The IKE module selects the first Diffie-Hellman CSP found by searching in the following order of preference by CSP type: The cryptographic strength of a Diffie-Hellman key pair is related to its prime number length (key size). The IKE specification, RFC 2409, defines three Diffie-Hellman groups with the following lengths:

Group 1 is 768 bits, Group 2 is 1024 bits, Group 5 is 1536 bits. The IKE module 40 may support a plurality of methods for authentication. For example, these methods may include Kerberos, Certificate-based digital signature, and/or Preshared key.

Upon either the completion of Main Mode negotiation, and the User Mode negotiation described below, or the expiration of a Quick Mode SA, Quick Mode negotiation is initiated. The IKE module 20 queries the policy module to determine appropriate filter actions, including whether the link is tunnel or transport, the protocol is ESP and/or AH, and the encryption and hashing algorithms are proposed or accepted. Quick Mode negotiation messages may be protected with the ISAKMP SA established during Main Mode and User Mode. Each successful Quick Mode SA negotiation establishes two IPSec SAs. One is inbound and the other is outbound. The following Table lists possible messages exchanged by two IPSec peers during Quick Mode negotiations 66.

| Quick Mode Message | Sender | Payload |
|---|---|---|
| 1* | Initiator | ISAKMP header, Security Association (contains proposals and secure traffic description) |
| 2* | Responder | ISAKMP header, Security Association (contains a selected proposal) |
| 3* | Initiator | ISAKMP header, Hash |
| 4* | Responder | ISAKMP header, Notification |

*ISAKMP payloads of message are encrypted.

The Quick Mode messages illustrated above are:
1. Includes a Security Association payload that contains a list of proposals and encryption and hashing algorithms for how to secure the traffic (AH vs. ESP, DES vs. 3DES, MD5 vs. SHA) and a description of the traffic that is protected. This description may include IP addresses, IP protocols, TCP ports, or UDP ports and is based on the matching filter of the initiator.
2. Includes a Security Association payload that contains the chosen method of securing the traffic.
3. Includes a Hash payload that provides verification and replay protection.
4. May be optionally included to enable synchronization between IPSec peers.

Some of the possible related filter action choices described above are listed in the following Table.

| Filter Action Choices | ESP Encryption/Integrity Algorithm | AH |
|---|---|---|
| High | DES/MD5 | None |
| Medium | None | MD5 |
| Custom | DES, 3DES, or none/MD5, SHA-1, or none | MD5 or SHA-1 |

The IKE module 20 generates session keys for both the inbound and outbound IPSec SAs based on the Main Mode shared master key and nonce material exchanged during the User Mode/Quick Mode negotiations. Additionally, Diffie-Hellman key exchange material can also be exchanged and utilized to enhance the cryptographic strength of the IPSec session key.

Turning now to FIG. 2a, a system 10d illustrates a User Mode (UM) exchange 80a between a client/initiator system 84a and a server/responder system 84b in accordance with multiple user authentication of the present invention. The UM exchange 80a may be an arbitrary number of exchanges between the initiator 84a and the responder 84b. The initiator 84a may begin the UM exchange 80a by sending the following UM packet 86a:

Initiator:
UidI, [UidR], SA, NonceI, proxy_src,proxy_dst ->
    wherein a UM reply packet 86b is returned by the responder 84b:
Responder:
        <- UidR, SA, NonceR,[CRPs]
    with as many user authentication payloads 90a and 90b as necessary to complete the exchange.
90a [Auth] ->
                              90b <- [Auth].

The responder 84b sends the last packet of the UM exchange 80a. If there is no final message from the responder 84b for authentication purposes, the responder 84b may send a UM_FINAL notify (not shown). The UidI and UidR are the identities of the Initiator 84a and Responder 84b, respectively. The UidR may be optionally sent by the Initiator 84a to enable the "server" 84b to rekey for a particular user. For example, a first user on the client 84a may be communicating to the server 84b for all traffic. The first user then initiates network traffic, which drives a negotiation between the client 84a and the server 84b. With Main Mode set up as described above, then in the UM exchange 80a, since the client hasn't communicated to the server before, the client doesn't know the server's identity, so the UidR is not sent. The authentication 90a and 90b proceeds, and the UM is established. Now, the Quick Mode rides on top of this UM as described above. If the lifetime expires on the server for the Quick Mode, the server may need to rekey. If there is second user on the client 84a, the server 84b, when rekeying the UM (on the rekey, the server is the initiator), sets the UidR to the first user's ID to alert the client 84a that it is rekeying for the first user, and not the second user. It is to be appreciated that security policy on the client 84a may need to be configured to enable the rekey.

The contents of the UidI and UidR fields may be simple DWORDs unique to the network systems to provide policy mappings and management. Thus, for two users, U1 and U2 on machine A, an exemplary U1 UidI may be 0x12341234, and an exemplary UidI for U2 may be 0x19283747. These IDs may remain fixed for the lifetime of the IKE service. If one of the machines reboots, then the Uids may change. Part of the user exchange authentication is to exchange the Uids the may be externally relevant. For example, in a certificate model, the ID may be the distinguished name of the certificate (or perhaps an entire end entity certificate). In a Kerberos model, the Kerberos id, which is a domain and user or service ID, may be exchanged in the SA payload.

The proxy_src and proxy_dst fields in the initiator packet 86a indicates which type of traffic (e.g., L2TP, RADIUS) is to be secured by the UM exchange 80a. These fields may be related to the contents of conventional Quick Mode proxy ids. The SA fields in the packets 86a and 86b may include authentication attributes. Such attributes may specify the type of user authentication (e.g., certificate, Kerberos, legacy), and if the server needs to re-authenticate. The Nonces in the initiator and responder packets 86a and 86b are for liveness (e.g., anti-replay).

The UM authentication may depend on the authentication type selected in the original SA. For example, if certificate authentication is selected. The initiator 84a may receive certificate request payloads (CRPs) in the responder packet 86b, and construct certificate and digital signature payloads. If the responder 84b doesn't accept some attribute in the certificate, an INVALID_CERT_CHAIN notify (not shown) may be sent. The initiator 84a may then construct another chain, if possible, and retry. Similarly, this applies if the responder 84b is re-authenticating. In this manner, more specific certificate attributes may be set in policy, and that policy needn't be exposed to the world. Also, trusted roots associated with the UM are sent under the protection of the Main Mode, and fully encrypted, and are therefore much less vulnerable than CRPs sent in Main Mode.

The following example demonstrates a user authentication, wherein the responder 84b continues to employ the machine identification, and therefore doesn't re-authenticate.

```
Initiator              Responder
UidI, [UidR], SA, NonceI, proxy_src,proxy_dst ->
                       <- UidR, SA, NonceR, CRP1, CRP2, CRP3
CertChain1,Sig ->
                       <- NOTIFY: INVALID_CERT_CHAIN
CertChain2, Sig ->
                       <-NOTIFY: UM_FINAL
```

If the authentication method selected is Kerberos, then the authentication payloads 90a and 90b may be the standard GSSAPI packets that are exchanged until both sides agree (or fail) the user authentication. It is noted that there are no lifetime attributes sent as part of the UM negotiation. The UM will be invalidated when its underlying Main Mode is deleted. Without the Main Mode, the UM may no longer be employed to form any new SAs. Either side (initiator/responder) may send separate delete payloads to delete a UM. The UM may also be identified by a security parameter index "spi" associated with the UidI and UidR pair.

In accordance with the present invention, multiple users may be authenticated via separated traffic established by the system 10b and described in more detail below in relation to FIG. 2b. For example, if two users, U1, U2 on the client 84a were communicating to the server 84b. In order to keep traffic separate, policy (e.g., filters) are to be in place that separates their traffic. For example, a client filter/filter mirror 94a and associated socket 94b may be established for traffic initiated by U1. A dynamically "plumbed" filter 94c and associated socket 96d may be set up on the server 84b, wherein the server adjusts its filter 94c to receive communications from a port established by the client 84a. The filters 94a and 94c will be described below in more detail in relation to FIG. 2b. The second user, U2, may open a second UM exchange 80b with associated filters 96a, 96c, and sockets 96b and 96d.

Each user initiates their respective traffic to the server 84b. This implies there will be a single Main Mode between the client and the server—2 UMs, one for the client, one for the server, and 2 Quick Modes, one for each socket pair. If the client were to close and open a few more sockets, this will create new Quick Modes that ride on top of the Main Mode and the client's UM associated with U1. In this manner, each user is authenticated via separate and encrypted channels. Thus, network security is improved over conventional systems that do not authenticate to the user level since each users identity is encrypted and separated from the other user. It is noted that although two users are illustrated in the above examples, a plurality of users may be authenticated in accordance with the present invention.

User Mode authentication enables much flexibility and advantages over conventional systems. Some of the possible security situations that may be supported are outlined as follows:
 1. Full, highest security, such as one-way user authentication. For example, in this mode, the machine employs an authentication credential, and all users employ their own credential. The MM provides a mutual authentication of the machines, and the UM authenticates the user. No additional server authentication will be done in UM.
 2. Full, highest security, mutual user authentication. For example, specify in policy "server side" that all incoming connections matching this traffic pattern will be serviced by a given policy and hard coded user account. Then, mutual authentication will be done in UM. This also covers the case of multiple services on the server each with a different authentication. (e.g., each service is a different "system" user.)
 3. Single user machine optimization. For example, in MM, a user credential will be employed. This allows a machine to function with only user credentials. This can be utilized in the single user case. In this case, mutual authentication will occur in MM, and UM is unnecessary. This has the drawback of potentially giving the users identity to an untrusted party.
 4. One-way authentication in MM. For example, in this mode, the initiator will not do any authentication in MM, but will authenticate the machine of the responder. Then in UM, the user will authenticate itself. The hash (signature) verification in UM is tied to attributes (and keys) in the MM. Also, a strong authentication method (e.g., certs or kerberos) are employed. While this is desirable from a client side deployment view, it will open the server up to potential denial of service since it is creating a MM without authenticating the peer. While it is valid to run a QM on top of a mutually authenticated MM without an intervening UM, it is invalid to do so for a one-way authenticated MM.
 5. No auth in MM. This turns MM into an unauthenticated DH. Then each side will need to authenticate itself in UM. This works best in deployments that have multiple services on the same server, each with different authentication methods. The drawback is that while user info and traffic type are now encrypted, you still cannot trust your peer since you haven't authenticated them yet.

Thus, a QM can be run on top of a MM/UM combo as long as there is a mutual authentication across both of them. For example, this can either be totally in the MM, totally in the UM, totally in both, and all combinations thereof. The above do not exhaust all possibilities, but are the most useful. The benefits of doing MM authentication are being more resilient to denial of service, and trusting the peer when sending out the user ids and traffic filters.

Now referring to FIG. 2b, exemplary filters described in FIG. 2a are shown in more detail. For example, an exemplary client filter 100a to isolate user traffic may be set up as follows:
    me->server, cporta, sport, tcp,
    wherein cporta and sport are client and server ports respectively, tcp is a selected protocol, and me->server specifies direction of communications from client to server. The client may isolate a second users traffic via a separate filter 100b as follows:
    me->server, cportb, sport, tcp,
    wherein traffic is isolated between multiple users at the client by the client port identified in the filter. The server may then dynamically plumb filters 100c and 100d associated with communications from each client port—a or b in this example. In this manner, traffic is isolated between users since each user is bound to a different socket and specifies a different port to provide communications.

Figure 3:
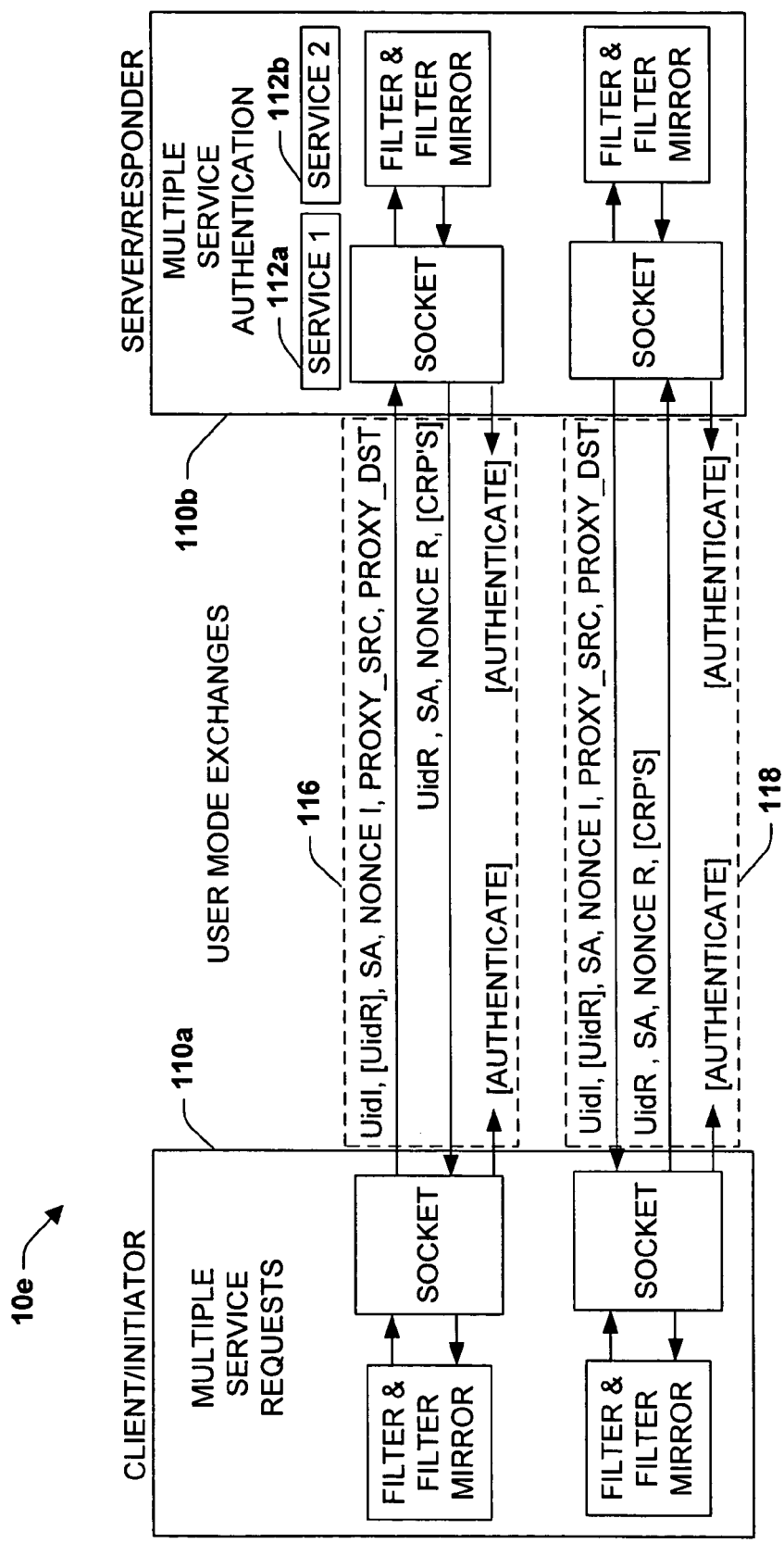
FIG. 3 is a schematic block diagram illustrating a system for providing multiple service authentication in accordance with an aspect of the present invention.

Referring now to FIG. 3, a multiple service authentication system 10e is illustrated in accordance with the present invention. According to this aspect, a single client 110a communicates to a first service 112a, and a second service 112b associated with a server 110b. For example, an L2TP service may be associated with the service 112a and a RADIUS service associated with the service 112b. In the user mode, since the Uid and the SA are specified along with the proxy Id's of a user mode initiator packet 116, the server 110b may attempt a policy lookup to secure the traffic specified (e.g., L2TP, RADIUS, etc.) in the initiator traffic. This may be achieved since the server 110*b* is being alerted to the specific user traffic type via the initiator packet 116. This created problems for conventional Main Mode systems wherein all that was identified was an IP address policy lookup.

As an example of an improvement over a conventional system, policy may be configured such that L2TP and RADIUS services are enabled for either a certificate 1 or certificate 2 authentication type, for example. As far as the client 110*a* is concerned, since these authentication methods are identical, a second user mode may not be generated since either service may be authenticated with the same certificates. However, that policy may not be acceptable to the server 110*b*. Therefore, the server 110*b* may fail the User Mode negotiation and send back a fail/notify message (not shown). The server 110*b* may then reinitiate a User Mode packet 118 back to the client 110*a*, since the server has the client Uid from the failed negotiation. Thus, the server 110*b* becomes the initiator and generates the user mode negotiation 118 since the server policy does not match the client 110*a*. The server would not invalidate the user mode for the previous service request, however. Multiple service authentication is generally not feasible in conventional Main Mode architectures because if a service negotiation fails on the server side, the server has not yet observed what kind of traffic to protect with the negotiation, if the negotiation had succeeded. Thus, conventional Main Mode systems do not have enough information to drive negotiations back in another direction.

Figure 4:
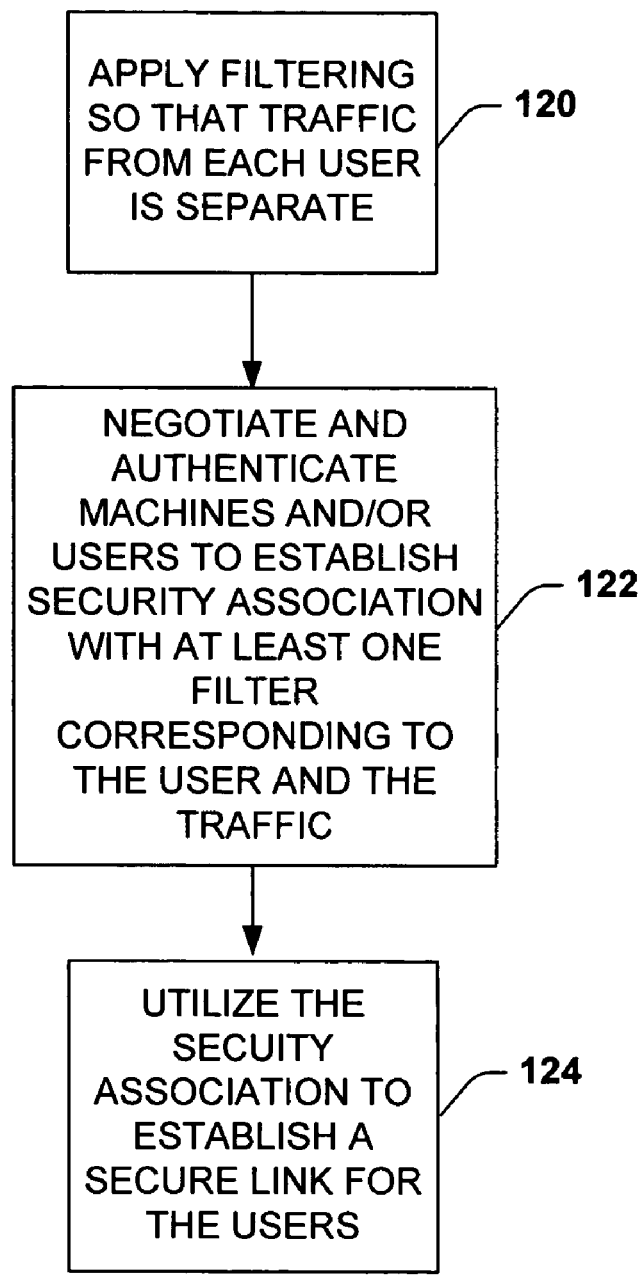
FIG. 4 is a flow chart diagram illustrating a methodology for providing multiple user authentication in accordance with an aspect of the present invention.
Figure 5:
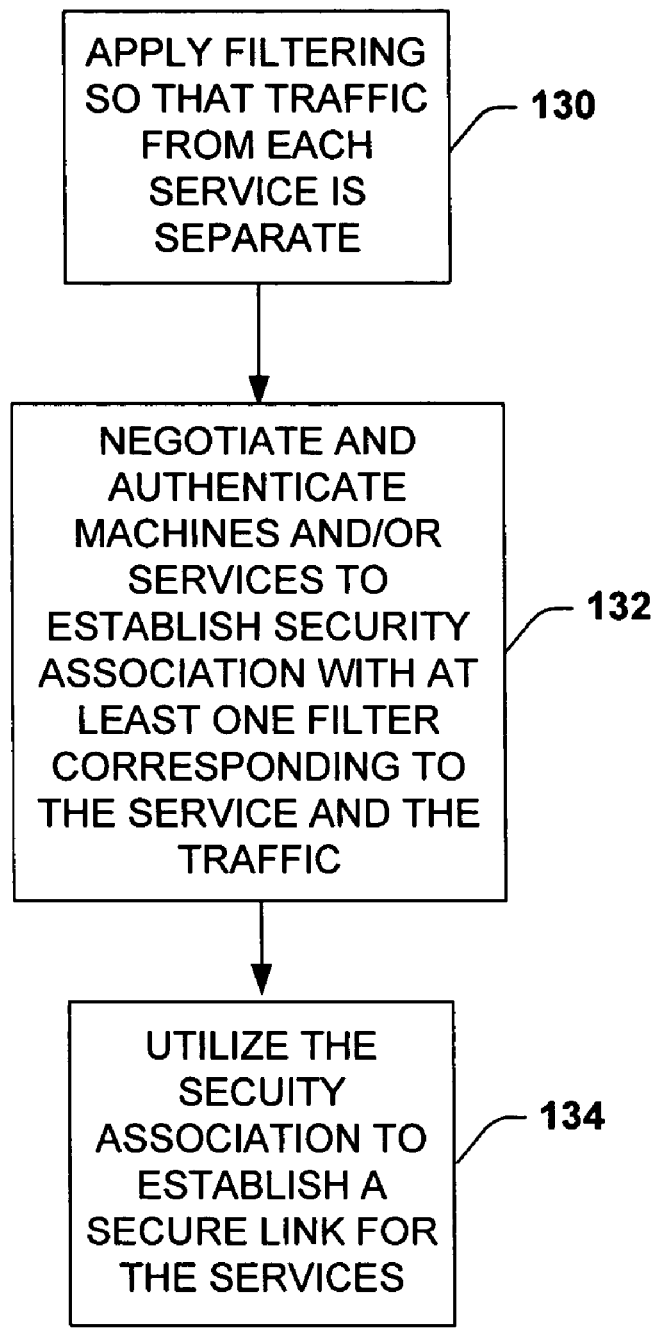
FIG. 5 is a flow chart diagram illustrating a methodology for providing multiple service authentication in accordance with an aspect of the present invention.

FIGS. 4 and 5 illustrate a methodology for providing a multiple user and service authentication system in accordance with an aspect of the present invention. While, for purposes of simplicity of explanation, the methodology is shown and described as a series of steps, it is to be understood and appreciated that the present invention is not limited by the order of steps, as some steps may, in accordance with the present invention, occur in different orders and/or concurrently with other steps from that shown and described herein. For example, those skilled in the art will understand and appreciate that a methodology could alternatively be represented as a series of interrelated states, such as in a state diagram. Moreover, not all illustrated steps may be required to implement a methodology in accordance with an aspect the present invention.

Referring to FIG. 4, a flow chart diagram illustrates a methodology for providing a multiple user authentication system in accordance with an aspect of the present invention. At step 120, filtering is applied to a client and server system in order that user traffic may be separate. As described above, the server may dynamically plumb the filters in order to match communications associated with each filter associated with the client system. At step 122, a security association is negotiated and authenticated with at least one of the filters described in step 120. The security association corresponds to each identified user and their associated traffic. The security association may be negotiated as part of a User Mode exchange as described above. At step 124, the security association negotiated in step 122 is utilized to establish secure links for each user operating on the client system and the server system.

Referring to FIG. 5, a flow chart diagram illustrates a methodology for providing a multiple service authentication system in accordance with an aspect of the present invention. At step 130, filtering is applied to a client and server system in order that service traffic may be separate. As described above, the server may dynamically plumb the filters in order to match communications associated with each filter associated with the client system. At step 132, a security association is negotiated and authenticated with at least one of the filters described in step 130. The security association corresponds to each identified service and their associated traffic. The security association may be negotiated as part of a User Mode exchange as described above. At step 134, the security association negotiated in step 132 is utilized to establish secure links for each service requested by the client system that operates on the server system.

Figure 6:
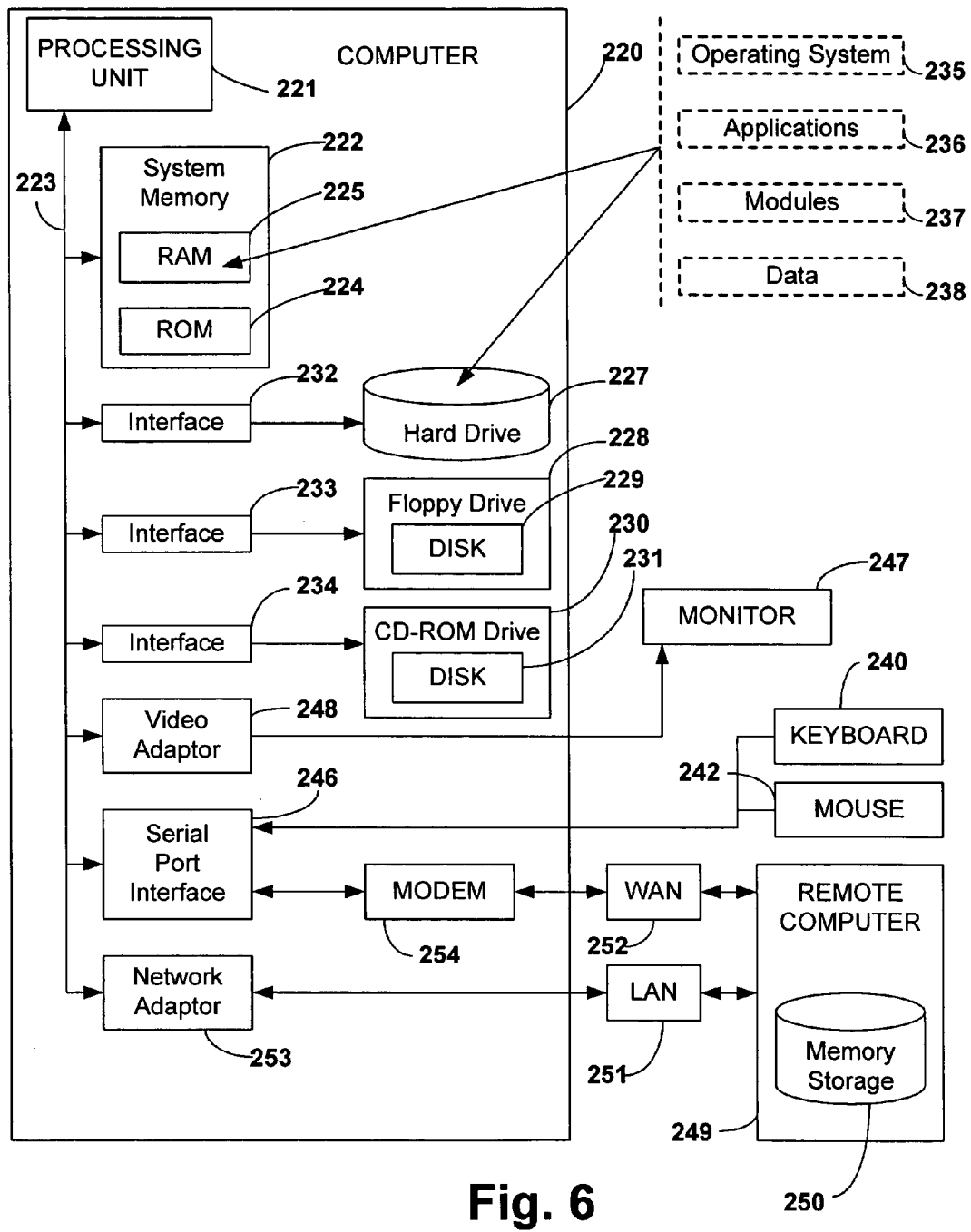
FIG. 6 is a schematic block diagram illustrating a suitable computing environment in accordance with an aspect of the present invention.

In order to provide a context for the various aspects of the invention, FIG. 6 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 6, an exemplary system for implementing the various aspects of the invention includes a conventional computer 220, including a processing unit 221, a system memory 222, and a system bus 223 that couples various system components including the system memory to the processing unit 221. The processing unit 221 may be any of various commercially available processors. Dual microprocessors and other multi-processor architectures also can be used as the processing unit 221. Dual microprocessors and other multi-processor architectures also may be employed as the processing unit 221.

The system bus may be any of several types of bus structure including a memory bus or memory controller, a peripheral bus, and a local bus using any of a variety of commercially available bus architectures. The system memory may include read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading from or writing to a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be any suitable operating system for use in connection with the herein described invention.

A user may enter commands and information into the computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote computer 249. The remote computer 249 may be a workstation, a server computer, a router, a peer device or other common network node, and typically includes many or all of the elements described relative to the computer 220, although only a memory storage device 250 is illustrated in FIG. 6. The logical connections depicted in FIG. 6 may include a local area network (LAN) 251 and a wide area network (WAN) 252. Such networking environments are commonplace in offices, enterprise-wide computer networks, Intranets and the Internet.

When employed in a LAN networking environment, the computer 220 may be connected to the local network 251 through a network interface or adapter 253. When utilized in a WAN networking environment, the computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system that establishes a secure link between one individual user of multiple users of a single machine and a remote machine, the system comprising:
   a security subsystem that filters traffic so that traffic for each user is separate and is adapted to establish the secure link by:
      exchanging authentication information for the single machine between the single machine and the remote machine during a machine authentication process to authenticate the single machine to the remote machine;
      exchanging authentication information for the individual user between the single machine and the remote machine during a user authentication process to authenticate the individual user to the remote machine, wherein the authentication information for the individual user is exchanged over a link secured using security information derived during the machine authentication process; and
      using security information derived during the user authentication process to communicate securely between the single machine and the remote machine to generate at least one Security Association (SA) for the secure link between the single machine and the remote machine, generating the at least one SA with at least one filter that corresponds to the individual user, and employing the at least one SA to establish the secure link.

2. The system of claim 1, wherein the security subsystem is located on the single machine.

3. The system of claim 1, wherein the security subsystem is located on the remote machine.

4. The system of claim 1, the security subsystem further comprises an Internet Key Exchange module and a policy module that generates the security association.

5. The system of claim 4, wherein the policy module is configured via Internet Protocol Security (IPSEC).

6. The system of claim 5, wherein the policy module comprises filters to filter traffic associated with the single machine and the remote machine.

7. The system of claim 6, wherein a filter of the policy module is associated with a communications port on the single machine.

8. The system of claim 7, wherein the security subsystem is located on the single machine, and the remote machine determines filters dynamically to communicate with the filters associated with the single machine.

9. The system of claim 4, wherein the IKE module performs the user authentication process by performing User Mode negotiations.

10. The system of claim 9, wherein the IKE module performs the machine authentication process by performing Main Mode negotiations.

11. The system of claim 10, wherein the User Mode negotiations are performed in a way to enable a plurality of Quick Mode negotiations over time to provide the secure link between the individual user and the remote machine in a plurality of instances.

12. The system of claim 11, wherein the User Mode negotiations comprise exchanging an initiator packet including at least one of a user identification initiator, a security association attribute, a nonce initiator, a proxy source, and a proxy destination.

13. The system of claim 12, wherein the initiator packet further comprises a user identification responder.

14. The system of claim 11, wherein the User Mode negotiations comprise exchanging a responder packet including at least one of a user identification responder, a security association attribute, and a nonce responder.

15. The system of claim 11, wherein the User Mode negotiations comprise exchanging a plurality of authentication packets.

16. A system that establishes a secure link between a first machine and an individual service of multiple services on a second machine, the system comprising:
  a security subsystem adapted to establish the secure link by:
    exchanging authentication information for the first machine between the first machine and the second machine during a machine authentication process to authenticate the first machine to the second machine;
    exchanging authentication information for the individual service between the first machine and the second machine during a service authentication process to authenticate the individual service to the first machine, wherein the authentication information for the individual service is exchanged over a link secured using security information derived during the machine authentication process; and
    using security information derived during the service authentication process to communicate securely between the first machine and the second machine to generate at least one Security Association (SA) for the secure link between the first machine and the second machine, generating the at least one SA, and employing the at least one SA to establish the secure link.

17. The system of claim 16, wherein the security subsystem further comprises an Internet Key Exchange module and a policy module that generates the security association.

18. The system of claim 17, wherein the policy module is configured via Internet Protocol Security (IPSEC).

19. The system of claim 18, wherein the policy module comprises filters to filter traffic associated with the first machine and the second machine.

20. The system of claim 19, wherein a filter of the policy module is associated with a communications port on the first machine.

21. The system of claim 20, wherein the security subsystem is located on the first machine, and the second machine determines filters dynamically to communicate with the filters associated with the first machine.

22. The system of claim 17, wherein the IKE module performs the service authentication process by performing User Mode negotiations.

23. The system of claim 22, wherein the User Mode negotiations comprise exchanging an initiator packet that includes at least one of a user identification initiator, a security association attribute, a nonce initiator, a proxy source, and a proxy destination.

24. The system of claim 23, wherein the multiple services are authenticated on the second machine by utilizing a policy look-up associated with service information relating to the initiator packet.

25. The system of claim 24, wherein, when a multiple service authentication fails, the second machine initiates the User Mode negotiations.

26. A method for establishing secure links between each of multiple users of a single machine and a remote machine, the method comprising:
  during a machine authentication process, transmitting first machine authentication information for the single machine to the remote machine to authenticate the single machine to the remote machine, and receiving second machine authentication information for the remote machine from the remote machine to authenticate the remote machine to the single machine;
  for a first individual user of the multiple users:
    during a first user authentication process, transmitting first user authentication information for the first individual user to the remote machine to authenticate the first individual user to the remote machine and receiving second user authentication information for a remote user of the remote machine to authenticate the remote user to the single machine;
    using security information during the first user authentication process to communicate securely between the single machine and the remote machine to generate at least one first Security Association (SA) for a first secure link between the single machine and the remote machine;
    generating the at least one first SA with at least one first filter corresponding to the first individual user; and
    employing the at least one first SA to establish the first secure link for the first individual user; and
  for a second individual user of the multiple users:
    during a second user authentication process, transmitting first user authentication information for the second individual user to the remote machine to authenticate the second individual user to the remote machine and receiving second user authentication information for a remote user of the remote machine to authenticate the remote user to the single machine;
    using security information during the second user authentication process to communicate securely between the single machine and the remote machine to generate at least one second Security Association (SA) for a second secure link between the single machine and the remote machine;
    generating the at least one second SA with at least one second filter corresponding to the first individual user; and
    employing the at least one second SA to establish the second secure link for the second individual user;
  using the at least one first filter of each at least one first SA and the at least one second filter of each of the at least one second SA to filter traffic so that traffic for the first individual user is separate from traffic for the second individual user.

27. A method for establishing a first secure link and a second secure link between a first machine and multiple services on a second machine, the method comprising:
  during a first machine authentication process, transmitting second machine authentication information for the second machine to the first machine to authenticate the second machine to the first machine, and receiving first machine authentication information for the first machine from the first machine to authenticate the first machine to the second machine;

for a first service of the multiple services:
during a first service authentication process, transmitting first service authentication information for the first service to the first machine to authenticate the first service to the first machine, wherein the first service authentication information for the first service is transmitted over a link secured using first security information derived during the first machine authentication process;

using second security information during the first service authentication process to communicate securely between the first machine and the second machine to generate at least one first Security Association (SA) for the first secure link between the first machine and the second machine;

generating the at least one first SA with at least one first filter corresponding to the first service; and employing the at least one first SA to establish the secure link; for a second service of the multiple services:

during a second service authentication process, transmitting second service authentication information for the second service to the first machine to authenticate the second service to the first machine, wherein the second service authentication information for the first service is transmitted over a link secured using third security information derived during the first machine authentication process;

using fourth security information derived during the second service authentication process to communicate securely between the first machine and the second machine to generate at least one second SA for the second secure link between the first machine and the second machine;

generating the at least one second SA with at least one second filter corresponding to the second service; and employing the at least one second SA to establish the second secure link;

applying to the at least one first filter and the at least one second filter to traffic received at the second machine such that traffic for the first service and traffic for the second service is separated; and when the first machine authentication information or the second machine authentication information or the first machine authentication information and the second machine authentication information expires, repeating the first service authentication process and the second service authentication process.

28. A system that establishes a secure link between multiple users of a single machine and a remote machine, the system comprising:

means for authenticating the single machine and each individual user of the multiple users by:
exchanging authentication information for the single machine between the single machine and the remote machine during a machine authentication process to authenticate the single machine to the remote machine, and exchanging authentication information for the individual user between the single machine and the remote machine during a user authentication process to authenticate the individual user to the remote machine, wherein the authentication information for the individual user is exchanged over a link secured using security information derived during the machine authentication process;

means for using security information derived during the machine authentication process and during a user authentication process for each individual user to communicate securely between the single machine and the remote machine to generate at least one Security Association (SA) for the secure link between the single machine and the remote machine and for generating, for each individual user, the at least one SA with at least one filter corresponding to the individual user;

means for employing the at least one SA to establish the secure link; and means for applying the at least one filter of each at least one SA to filter traffic so that traffic for each individual user is separate.

29. A system that establishes a secure link between a first machine and an individual service of multiple services on a second machine, the system comprising:

means for authenticating the first machine and the individual service by:
exchanging authentication information for the first machine between the first machine and the second machine during a machine authentication process to authenticate the first machine to the second machine;

exchanging authentication information for the individual service between the first machine and the second machine during a service authentication process to authenticate the individual service to the first machine, wherein the authentication information for the individual service is exchanged over a link secured using security information derived during the machine authentication process;

means for using security information derived during the machine authentication process and during the service authentication process to communicate securely between the first machine and the second machine to generate at least one Security Association (SA) for the secure link between the first machine and the second machine, generating the SA; and means for employing the SA to establish the secure link.

30. A computer readable storage medium having stored thereon computer executable instructions that, when executed by a computer, cause the computer to carry out a method for establishing a secure link between an individual user of a first machine having multiple users and a second machine, the method comprising:

during a machine authentication process, transmitting first machine authentication information for the first machine to the second machine to authenticate the first machine to the second machine, and receiving second machine authentication information for the second machine from the second machine to authenticate the second machine to the first machine;

during a user authentication process, transmitting first user authentication information for the individual user to the second machine to authenticate the individual user to the second machine and receiving second user authentication information for a remote user of the second machine to authenticate the remote user to the first machine;

using security information derived during the user authentication process to communicate securely between the first machine and the second machine to generate at least one Security Association (SA) for the secure link between the first machine and the second machine;

employing the SA to establish a secure link between the first and second machines; and when the first machine authentication information or the second machine authentication information or the first machine authentication information and the second machine authentication information expires, repeating the user authentication process, wherein the computer readable storage medium does not consist of a propagating signal.

31. A computer readable medium having stored thereon computer executable instructions that, when executed by a computer, cause the computer to carry out a method between an individual service of a first machine having multiple services and a second machine, the method comprising:

during a machine authentication process, transmitting second machine authentication information for the second machine to the first machine to authenticate the second machine to the first machine, and receiving first machine authentication information for the first machine from the first machine to authenticate the first machine to the second machine;

during a service authentication process, transmitting second service authentication information for the individual service to the first machine to authenticate the individual service to the first machine and receiving first service authentication information for a first service of the first machine to authenticate the first service to the second machine;

using security information derived during the service authentication process to communicate securely between the single machine and the remote machine to generate at least one Security Association (SA) for the secure link between the first machine and the second machine;

employing the SA to establish a secure link between the first and second machines; and when the first machine authentication information or the second machine authentication information or the first machine authentication information and the second machine authentication information expires, repeating the service authentication process, wherein the computer readable medium does not consist of a propagating signal.

* * * * *